United States Patent [19]
Gardziella et al.

[11] 4,113,898
[45] Sep. 12, 1978

[54] METHOD OF APPLYING POWDER COATINGS OF UNSATURATED BRANCHED HYDROXYESTER RESINS

[75] Inventors: Arno Gardziella, Witten-Rüdinghausen; Karl Jellinek, Letmathe, both of Germany

[73] Assignee: Rutgerswerke Aktiengesellschaft, Frankfurt am Main, Germany

[21] Appl. No.: 650,649

[22] Filed: Jan. 20, 1976

Related U.S. Application Data

[60] Continuation of Ser. No. 482,959, Jun. 25, 1974, abandoned, which is a division of Ser. No. 274,950, Jul. 25, 1972, abandoned.

[30] Foreign Application Priority Data

Jul. 27, 1971 [DE] Fed. Rep. of Germany ....... 2137513

[51] Int. Cl.$^2$ ............................................. B05D 3/02
[52] U.S. Cl. ..................................... 427/195; 427/27; 428/480; 428/481; 528/273; 528/304; 528/309
[58] Field of Search ................. 427/195, 185, 27, 375; 260/75 UA; 428/480, 481

[56] References Cited

U.S. PATENT DOCUMENTS

| | | | |
|---|---|---|---|
| 2,936,296 | 5/1960 | Precopio et al. | 427/195 |
| 3,055,867 | 9/1962 | Le Brac et al. | 260/75 |
| 3,205,192 | 9/1965 | Denson | 427/195 |
| 3,340,083 | 9/1967 | Robitschek | 427/195 |
| 3,340,136 | 9/1967 | Burns et al. | 260/75 |

FOREIGN PATENT DOCUMENTS

| | | | |
|---|---|---|---|
| 1,191,570 | 4/1965 | Fed. Rep. of Germany | 427/195 |
| 1,047,684 | 11/1966 | United Kingdom | 427/195 |
| 927,786 | 6/1963 | United Kingdom | 427/195 |
| 1,255,070 | 4/1971 | United Kingdom | 427/195 |

OTHER PUBLICATIONS

Berger et al, Am. Paint J. 46 (24), 74-84 (1962).
Boeing, "Unsaturated Polyesters," Elsevier, New York, 1964, pp. 6, 100-102.

*Primary Examiner*—Shrive P. Beck
*Attorney, Agent, or Firm*—Beveridge, DeGrandi, Kline & Lunsford

[57] ABSTRACT

An unsaturated, branched hydroxyester resin produced by the esterification of a saturated or unsaturated aliphatic or aromatic dicarboxylic acid with a mixture comprising about 75 – 97 mole percent of a bivalent alcohol and about 25 – 3 mole percent of a multifunctional alcohol having at least three hydroxy groups, said hydroxyester resin having a hydroxyl number of about 30 – 110, is employed in the production of quick hardening powder enamels capable of forming plastic coatings.

13 Claims, No Drawings

METHOD OF APPLYING POWDER COATINGS OF UNSATURATED BRANCHED HYDROXYESTER RESINS

This is a continuation, of application Ser. No. 482,959 filed June 25, 1974, now abandoned, which in turn is a division of application Ser. No. 274,950, filed July 25, 1972, now abandoned.

This invention relates to the use of unsaturated branched hydroxyester resins in the production of quick hardening powder enamels which are capable of forming plastic coatings on metals and other substrates.

A large number of processes are known in the art for the application to a substrate of a powder capable of forming a plastic coating. The powders typically have a particle size distribution in the range between 20 and 500 microns. The powder is typically applied to a metal, ceramic or other substrate and heated to form a plastic coating on the substrate. Typical of the known processes are immersion sintering, roll sintering, scatter sintering, pour sintering, spray sintering, whirl sintering, and flame spraying. A particularly modern method known since 1962 is electrostatic powder coating.

It is a characteristic of these known processes that the coating is applied to the substrate without use of a solvent. As recognized by the art skilled, this has numerous economic and processing advantages as compared to the conventional enameling methods using solvents.

Both thermoplastic and thermosetting plastics are used as raw materials for these coating substances in the so-called "powder enameling" processes.

German published applications 1,193,672 and 1,033,291 disclose hydroxyester resins containing saturated branched terephthalic acid. British Pat. No. 1,047,684 describes the interlacing of such saturated polyesters with acid anhydrides. German published application 1,469,895 discloses the production of solid linear unsaturated polyester resins from terephthalic acid, fumaric acid and various glycols. This reference also teaches that these resins can be combined with monomeric substances to form thermosetting molding compounds.

Among other plastics which can be used in the known processes are: polyolefins, thermoplastic saturated polyesters, polyvinylchlorides, polyfluoroolefins, epoxy resins and thermosetting polyester resins. The epoxy resins are generally disadvantageous because the plastic coatings produced from these are generally not resistant to outside atmospheric conditions. Branched, saturated polyester resins generally do not have this drawback, but they must be processed with interlacer systems. Also, they require relatively high baking temperatures and long baking times during processing. While thermoplastic linear polyesters can generally be baked at lower temperatures depending on their melting range, they have only limited thermal capacity because of their relatively low glass transition point.

Work pieces to be coated with unsaturated linear polymerizable polyester resins must generally be subjected to special expensive pretreatments in order to obtain adequate adhesion of the coating since the coating shrinks considerably during the polymerization-hardening process. Thus, such binders are generally not used for the preparation of powder enamels.

There has been a need in the art for a resin base for plastic coating which can be applied by powder enameling techniques. The resin base should make it possible to achieve a coating having good adhesion to a substrate, a coating resistant to yellowing, and a coating resistant to weathering. The coating should also be resistant to chalking. The enamel should be suitable for application on previously untreated metals, ceramic materials, wood and other substances. The enamel should also be quick hardening after application to the substrate.

Accordingly, this invention provides a new use of an unsaturated branched hydroxyester resin. The resin is produced by the esterification of a saturated or unsaturated aliphatic or aromatic dicarboxylic acid with an alcohol mixture. The alcohol mixture comprises about 75 – 97 mole percent of a bivalent alcohol and about 25 – 3 mole percent of a multifunctional alcohol having at least three hydroxy groups. The hydroxyester resin has a hydroxyl number of about 30 – 110, preferably about 40 – 80. The esters can be produced by the esterification of mixtures of saturated aliphatic and/or aromatic dicarboxylic acids, on the one hand, and/or unsaturated dicarboxylic acids, on the other hand.

The new use comprises a process for forming a powder enamel coating on a substrate by preparing the unsaturated, branched hydroxyester resin and applying it to the substrate.

The unsaturated, branched hydroxyester resins are suitable for the production of quick hardening powder enamels capable of forming plastic coatings. The resins of this invention preferably have acid numbers of about 5 – 40, preferably about 10 – 30.

In a preferred embodiment of this invention a mixture of saturated and unsaturated dicarboxylic acids is used in the esterification. The dicarboxylic acid component comprises about 30 – 80 mole percent fumaric acid.

In another preferred embodiment of this invention the dicarboxylic acid component comprises about 20 – 70 mole percent of at least one of the three isomers of phthalic acid.

The unsaturated, branched hydroxyester resins are preferably produced from one or more of the three isomers of phthalic acid, and optionally one or more other aliphatic dicarboxylic acids which have a total of 6 – 36 carbon atoms. The acids preferably contain at least one carbon-carbon double bond. Typical of the preferred acids are $\alpha,\beta$-unsaturated dicarboxylic acids, such as fumaric acids and maleinic acids as well as their derivatives.

The resins contain a mixture of a bivalent alcohol and a multifunctional alcohol having at least three hydroxyl groups. Typical of the suitable alcohols are ethylene glycol, diethylene glycol, propylene glycol, butylene glycol, pentanediol, hexanediol, 1,4-dimethylolcyclohexane, 2,2'-dimethyl-1,3-propanediol, tricyclodecanedimethylol and others. Typical of the multivalent alcohols are glycerin, trimethylolpropane, pentaerythrite, hexanetriol, sorbitol and others.

The method of preparing the hydroxyester resins will be readily apparent by reference to the following examples. All parts, proportions, percentages and ratios are by weight unless otherwise indicated.

EXAMPLE 1

A heated autoclave of stainless steel is charged with

| | | |
|---|---|---|
| 2.2 | kg | dimethyl terephthalate |
| 4.7 | kg | 1,4-butanediol |
| 0.75 | kg | trimethylolpropane |
| 4 | g | zinc acetate dihydrate |

The methanol developing during the reesterification is distilled at standard pressure, and removed with nitrogen. The temperature inside the autoclave is about 140° – 200° C.

Subsequently, after cooling to 120° C.

| 5.1 kg | fumaric acid |
|---|---|
| 4 g | tetraisopropyl titanate | are added, and heated to 200° C. in the course of about 6 hours under nitrogen and standard pressure until the theoretical quantity of water is almost completely distilled. After that, a vacuum is applied and the mixture is left for about 1 hour at 200° C. under vacuum until an acid number of 20 (mg KOH/g substance) is obtained.

The hydroxyl number of the unsaturated hydroxyester resin obtained in such a way is 70. The melting point is 88° C.

EXAMPLE 2

A polyester is produced from the same starting substances and in the same manner as Example 1, except that the resin has an acid number of 20, a hydroxyl number of 50 and melting point of 95° C. by leaving the mixture for about 75 minutes at 210° C. under vacuum.

EXAMPLE 3

In the same manner as in Example 1

| 2.2 kg | dimethyl terephthalate |
|---|---|
| 5.2 kg | 1,4-butanediol |
| 5.1 kg | fumaric acid | are reacted. An unsaturated linear polyester with the following characteristic data is obtained: hydroxyl number: 10; acid number: 20; melting point: 70° C.

EXAMPLE 4

In the same manner as in Example 1

| 3.4 kg | fumaric acid |
|---|---|
| 5.1 kg | dimethyl terephthalate |
| 3.2 kg | ethylene glycol |
| 0.75 kg | trimethylolpropane | are reacted. The unsaturated, branched hydroxyester resin obtained has the following characteristic data: hydroxyl number: 57; acid number: 28; melting point: 81°-83° C.

EXAMPLE 5

In the same manner as in Example 1

| 3.4 kg | fumaric acid |
|---|---|
| 5.1 kg | dimethyl terephthalate |
| 3.5 kg | ethylene glycol | ps are reacted.

The unsaturated linear polyester resin obtained has the following characteristic data: hydroxyl number 25; acid number: 32; melting point: 63° – 66° C.

EXAMPLE 6

In the same manner as in Example 1

| 3.9 kg | fumaric acid |
|---|---|
| 0.82 kg | dimethyl terephthalate |

-continued

| 1.2 kg | phthalic acid anhydride |
|---|---|
| 3.3 kg | ethylene glycol |
| 1.7 kg | 2,2'-dimethyl propanediol-1,3 |
| 1.8 kg | trimethylolpropane | are reacted.

The phthalic acid anhydride is added in a second stage together with the fumaric acid.

The unsaturated, branched hydroxyester resin obtained in such a manner has the following characteristic data: hydroxyl number: 51; acid number: 18; melting point: 52° – 55° C.

EXAMPLE 7

We proceed as in Example 6, but instead of phthalic acid anhydride the equivalent quantity of adipic acid is added concurrently with the fumaric acid. A resin with: hydroxyl number: 51; acid number; 29; melting point: 49° – 51° C. is obtained.

EXAMPLE 8

A heated autoclave made of stainless steel is charged with

| 4.56 kg | ethylene glycol |
|---|---|
| 0.48 kg | pentaerythrite |
| and | |
| 5 g | polymeric tetrabutyl titanate. |

After repeated rinsing with nitrogen, the inside temperature is adjusted to 150° C, and at this temperature

| 8.12 kg | fumaric acid |
|---|---| are added.

are added.

While introducing nitrogen, the temperature is increased to 210° C. over 6 hours and left at this temperature until 98% of the developing water is distilled.

Finally, the remaining water of the condensate and the excess glycol are distilled for about 1 hour under vacuum at 210° to 215° C. The unsaturated hydroxyester obtained in this way has the following characteristic data: hydroxyl number: 52; acid number: 15; melting point: 83° C.

EXAMPLE 9

In a heated autoclave:

| | 1.7 kg | ethylene glycol |
|---|---|---|
| and | | |
| | 1.1 kg | trimethylolpropane | are heated under nitrogen to 140° C.

5.9 kg dimethyl terephthalate are added at 140° C., and the temperature is increased in 8 hours to 220° C. while continuing to introduce nitrogen until the methanol liberated during re-esterification is distilled.

The hard melt which develops is left for another 2 hours at 225° C. for complete condensation. A saturated, branched polyester resin is obtained with a hydroxyl number of 118, an acid number of 0.2 and a melting point of 94°-97° C.

The melt is allowed to run into a kneader, and there thoroughly mixed at 140° C. with 0.65 kg pyromellitic acid dianhydride.

SAMPLE APPLICATION A

The polyester resins from Examples 1 to 8 are mixed in a double screw extruder at 130° C. with the following additives:
- 63 parts by weight polyester resin
- 35 parts by weight titanium dioxide powder
- 1 part by weight phthalic peroxide
- 1 part by weight leveling agent.

The extruded substance is ground very finely in a baffle rib blower mill, and from the ground material the main fraction, of between 40 and 100 microns fineness, is sifted for experiment C.

SAMPLE APPLICATION B

As in the Sample Application A, a powder with a grain distribution of 40 to 100 microns is produced from the following ingredients:
- 64 parts by weight resin-pyromellitic acid dianhydride mixture
- 35 parts by weight titanium dioxide powder
- 1 part by weight leveling agent.

SAMPLE APPLICATION C

The plastic powders produced in the Sample Applications A and B were applied by means of an electrostatic powder spray gun at 70 KV voltage to 70 × 150 mm size degreased steel sheets, and baked on at 180° C. The thickness of the layers is about 60–70 microns.

SAMPLE APPLICATION D

The resins of Examples 4 and 5 are kneaded together on a heated roll mill at 90° C. as follows:
- 90 parts by weight polyester resin
- 8 parts by weight titanium dioxide powder
- 1 part by weight tert. butyl perbenzoate
- 1 part by weight leveling agent The homogeneously rolled mass is ground in a blower mill to 40–90 microns fineness. The ground material is sprayed onto 150 × 70 mm beechwood panels by means of an electrostatic powder coating gun at 70 KV, and subsequently heated for 5 minutes at 110° C.

The coating derived from the resin of Example 4 adheres well after cooling on the wood and exhibits no crack formation [checking]. The coating derived from the resin of Example 5 exhibits poorer adhesion, and was considerably inclined to the formation of cracks.

What is claimed is:

1. A process for forming a coating on a substrate selected from the group consisting of metal, wood and ceramic, said coating comprising a powdered enamel, said process comprising:
   (a) preparing a powdered enamel comprising an unsaturated, branched hydroxyester resin having a hydroxyl number of about 30–110, said resin comprising the reaction product from the esterification of an unsaturated aliphatic or aromatic dicarboxylic acid with a mixture comprising about 75–97 mole percent of a bivalent alcohol and about 25–3 mole percent of a multifunctional alcohol having at least 3 hydroxy groups;
   (b) applying said enamel to said substrate; and
   (c) heating said powder enamel to its melting point so as to form a continuous coating on said substrate.

2. A process according to claim 1 in which said hydroxyl number of said hydroxyester resin is about 40–80.

3. A process according to claim 2 in which said resin has an acid number of about 5–40.

4. A process according to claim 2 in which said resin has an acid number of about 10–30.

5. A process according to claim 2 in which mixtures of saturated or unsaturated aliphatic or aromatic acids are used in the esterification.

6. A process according to claim 1 in which a mixture of saturated and unsaturated dicarboxylic acids is used The properties of the coatings applied in this manner are shown in the following table:

| Resin used from Example | Characterization of the Resin[1] | Baking time in Minutes[2] | Hydroxyl Number of the Resin | Characteristics of the Coating | | |
|---|---|---|---|---|---|---|
| | | | | Adhesion | Lattice cut according to DIN 53151*[3] | Cupping according to DIN 53156* mm |
| 1 | U - V | 3 - 4 | 70 | good | Gto | 10 |
| 2 | U - V | 3 | 50 | good | Gto | 9 |
| 3 | U - L | 3 | 10 | none | — | — |
| 4 | U - V | 3 | 57 | good | Gto | 8 |
| 5 | U - L | 3 | 25 | none | — | — |
| 6 | U - V | 3 | 51 | good | Gto | 7 |
| 7 | U - V | 3 | 51 | good | Gto | 8 - 9 |
| 8 | U - V | 2 - 3 | 52 | good | Gto | 8 |
| 9 | G - V | 30 | 118 | good | Gto | 6 - 8 |

[1] U = unsaturated
G = saturated
V = branched
L = linear
[2] minimum baking time
[3] Gto = no separation of the enamel layer
*DIN = German Industrial Standard The table shows clearly:

1. The linear, unsaturated polyester resins of Examples 3 and 5 having hydroxyl numbers outside the range of this invention do not bring about adhesion of a plastic coating formed therefrom on metal which has not been pretreated.

2. Coatings derived from the unsaturated, branched hydroxyester resins of Examples 1, 2, 4, 6, 7 and 8 adhere excellently and harden in a relatively short time.

3. Coatings derived from the saturated branched polyester resin of Example 9 require an uneconomically long baking time to achieve the desired characteristics.

The coatings derived from the resins of Examples 1, 2, 4 and 6 to 8 are subjected to a Xeno Test for 1000 hours, and no loss of gloss occurs. Even in the case of outdoor atmospheric conditions, no external chalking can be detected.

in the esterification, said dicarboxylic acid component comprising about 30–80 mole percent fumaric acid.

7. A process according to claim 6 in which the dicarboxylic acid component comprises about 20–70 mole percent of at least one of the three isomers of phthalic acid.

8. A process according to claim 7 in which the bivalent alcohol is selected from the group consisting of ethylene glycol, diethylene glycol, propylene glycol, butylene glycol, pentanediol, hexanediol, 1,4-dimethylol-cyclohexane, 2,2'-dimethyl-1,3-propanediol, tricyclodecanedimethylol and 1,4-butanediol, and the multivalent alcohol is selected from the group consisting of glycerin, trimethylolpropane, pentaerythrite, hexanetriol and sorbitol.

9. A process according to claim 8 in which the acid is fumaric acid.

10. A process according to claim 1 in which said unsaturated acid is an $\alpha$, $\beta$-unsaturated acid.

11. A process according to claim 1 in which said acid comprises about 30–80 mole percent fumaric acid and about 20–70% of at least one of the three isomers of phthalic acid.

12. A process according to claim 1 in which the unsaturated dicarboxylic acid is in admixture with one or more aliphatic dicarboxylic acids, wherein the total number of carbon atoms in said aliphatic dicarboxylic acids is 6 to 36.

13. A process according to claim 12 in which said unsaturated acid is fumaric acid or maleic acid.

* * * * *